United States Patent [19]
Lavering et al.

[11] 3,746,087
[45] July 17, 1973

[54] HEAT DISSIPATION DEVICE
[75] Inventors: Gordon R. Lavering, Belmont; Charles M. Eallonardo, Supertino, both of Calif.
[73] Assignee: Varian Associates, Palo Alto, Calif.
[22] Filed: Apr. 19, 1971
[21] Appl. No.: 135,472

[52] U.S. Cl.................. 165/185, 313/182, 315/3.5
[51] Int. Cl................................................ F28f 7/00
[58] Field of Search................... 165/185, 180, 181, 165/81

[56] References Cited
UNITED STATES PATENTS
3,354,949  11/1967  De Castelet ..................... 165/181
3,327,779  6/1967   Jacoby............................. 165/185
3,193,610  7/1965   Worden, Sr..................... 165/185 X Primary Examiner—William F. O'Dea
Assistant Examiner—William C. Anderson
Attorney—Stanley Z. Cole

[57] ABSTRACT

A device is disclosed for use in dissipating heat from a heated object when restrictions on expansion of the heated object and the heat dissipation device cause stresses in the device, in any containing structures and in the bonds at the interfaces of the device with other structures. The device is comprised of thin members which have been formed in a shape distorted from the lines normal to the surface of attachment of the members to the object. The members surround and are in thermal contact with the heated object. As the members and object expand and contract during temperature cycling, the members deform, allowing the heated object to move relative to surrounding structures, thus relieving stress. When such movement is constrained, the members are thin enough to relieve stress by deformation into the space between the members. A preferred embodiment of this device uses members which are shaped generally like a hollow truncated cone.

13 Claims, 6 Drawing Figures

Patented July 17, 1973  3,746,087

INVENTORS
GORDON R. LAVERING
CHARLES M. EALLONARDO
BY Daniel R. West
ATTORNEY

HEAT DISSIPATION DEVICE

BACKGROUND OF THE INVENTION

This invention relates to a device for the dissipation of heat from a heated object.

As an object is heated and cooled, it expands and contracts. In many applications it is necessary to provide structure which will conduct the heat away from the object to the exterior of the system of which it is a part. Otherwise the object being heated might get too hot, causing system failure. However, it is usually the case that the various structures involved do not all have the same thermal expansion coefficients. As a result, as the various structures are heated and cooled, stresses are created at the bonded surfaces and in the structures themselves. Such stresses can cause the bonds or structures to break down.

In some heat dissipating structures there may be no stresses at ambient temperatures. Often, however, there will be stress at ambient temperatures and these stresses may, in fact, be relieved during heating of the object, increasing again as the object cools. These stresses are created when the heat dissipating structure is assembled because of the high temperatures required in brazing. For example, if copper is used in the structure, the brazing temperature may be above the annealing temperature of copper. Therefore, these may be no stress in the structure at the high brazing temperature. However, as the structure cools after brazing, the copper hardens. As it cools further, stresses may be created at the just formed bonds between members having different thermal expansion coefficients, and in the members themselves. If the stresses are too great, the bonds or members will break down.

An example of a heated object is a copper beam striker in a travelling wave tube. The portion of the beam power which is not converted into useful r.f. output power is converted into heat which must be dissipated. Because it is often electrically insulated from the external system, this beam striker is typically on the axis of a ceramic cylinder. The heat must be transferred radially from the beam striker out through the ceramic cylinder. If the volume between the beam striker and the surrounding cylinder is filled with a material with a thermal expansion coefficient higher than the ceramic cylinder, such as copper, the cylinder constrains any radial expansion of the beam striker and the surrounding copper as they expand during the heating to brazing temperature during assembly. All expansion of the beam striker and surrounding copper relative to the ceramic cylinder must therefore be along the axis of the ceramic cylinder. Then as the structure cools down, because the ceramic cylinder contracts less rapidly than the copper, the bond between the ceramic cylinder and the copper and the cylinder itself will be under stress. The bond could break down or the cylinder could fracture.

If expansion in some other direction is also constrained even greater stresses are created at the interfaces in the system and in the various structures. For example, in one type of sealed beam short arc lamp designed to have heat transferred radially away from the anode, radial expansion is constrained by a ceramic cylinder surrounding the anode structure while expansion along the axis of the cylinder is constrained in one direction by the seals required to maintain high pressure in the lamp.

A heat dissipation device is required which will relieve at least some of the stresses created during expansion and contraction. This will serve to reduce the stresses at any interface between materials with different thermal expansion coefficients, as well as stresses in the structures themselves. In general, this stress reduction is accomplished in the prior art by leaving spaces in the thermally conductive material. In particular, spaces were left at the interfaces between the materials having different thermal expansion coefficients in order to provide a plurality of smaller surfaces rather than a single larger surface over which stress is built up. However, any such spaces reduce the heat transfer cross sectional area and thus restrict the power transfer capability of the heat dissipation device. In addition, without careful designing, there will still be significant expansion in directions other than that for which stress relief has been provided and stresses at the various interfaces may still be too great during temperature cycling.

One particular prior art design reduces stresses very effectively. This design is best applied to a cylindrical object on the axis of a constraining hollow cylinder. In this design vanes are attached tangentially to the cylindrical object. These vanes extend outward and are attached to the constraining cylinder. As the object and the vanes expand and contract, the vanes easily bend and the object rotates on its axis. While radial stress at the vane-cylinder interface is minor, expansion along the axis of the cylinder will cause shear stress at this interface because of the different thermal expansion coefficients. However, this stress is significantly less than in designs which fill the space between the object being heated and the cylinder. This vane design still has several major drawbacks, however. Only a limited number of vanes may be attached tangentially to the cylindrical object. Therefore, significant amounts of empty space remain which result in a reduction in heat dissipation capability. If it is important that the object being heated remain on the axis of the cylinder, careful positioning of the vanes is required when the system is assembled. This is a difficult process at best. If the object is irregularly shaped, assembly may be difficult. In a system in which the heated body cannot be allowed to rotate relative to the cylinder, this device cannot be used at all.

SUMMARY OF THE INVENTION

Briefly described, the present invention is an improved heat dissipation device. The heat dissipation device is comprised of one or more thin members which have a shape distorted from the lines normal to the surface of attachment of the member to the object. One convenient form is that of a hollow truncated cone.

An object of this invention is to reduce stress between a heat dissipation device and any structure to which it interfaces, as well as in the device and such structures themselves, by allowing movement of a heated object and deforming of the heat dissipation device in directions other than the direction of heat dissipation, when expansion in the direction of heat dissipation is restricted. While comprised of thin members, the heat dissipation device can substantially fill the volume available and therefore meet the object of increased heat transfer for the same volumetric configuration. When movement of the heated body is restricted, there is enough space and the members are thin enough to allow deformation as the members expand and contract, still meeting the objective of reduced stress.

DESCRIPTION OF THE PREFERRED EMBODIMENTS

Figure 1:
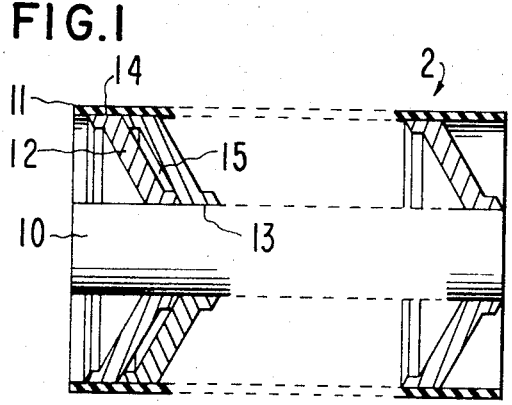
FIG. 1 is a cross-sectional view of apparatus incorporating one embodiment of the heat dissipation device of the present invention.
Figure 2:
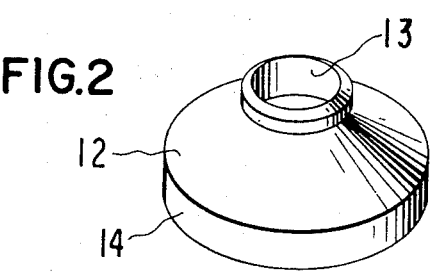
FIG. 2 is an isometric view of one member of the heat dissipation device of FIG. 1.

FIGS. 1 and 2 illustrate one embodiment of the present invention. An object 10 is heated during operation of the system of which it is a part. The heated object is shown as a cylinder with circular cross section. Such a body might be a copper beam striker in a travelling wave tube. In this embodiment the heated object is to be supported on the axis of a cylinder 11. In a travelling wave tube, this cylinder is of thermally conductive ceramic. Ceramic is used because the beam striker may need to be electrically insulated from the exterior of the cylinder. The members 12, shown isometrically in FIG. 2, support the element to be cooled, such as object 10, on the axis of the cylinder 11 and provide a heat path from the object to the cylinder. Members 12 are sufficiently thin to allow deformation under stress, as described more fully hereinafter, and are shaped generally like a hollow truncated cone. They are made of a material which will readily conduct heat, such as copper. At the apex of the cone the member is formed to provide a surface 13 for a thermally conductive braze to the heated object. At the base of the cone the member is also formed to provide a surface 14 for a thermally conductive braze the cylinder 11.

When the apparatus shown in FIG. 1 is assembled, the members 12 must be bonded at surfaces 13 and 14 to the object 10 being heated and to the cylinder 11, respectively. The stresses which are present after this assembly and later during operation of the apparatus depend on the temperatures required to produce the bond and on the relative thermal expansion coefficients of the object 10, the heat dissipating members 12 and the cylinder 11.

In the travelling wave tube, the object 10 (beam striker) and members 12 are of copper while the cylinder 11 is of ceramic, having a lower thermal expansion coefficient than copper. As the apparatus is heated during assembly, the copper object 10 expands axially relative to the ceramic cylinder 11 but, because no bonds have yet formed, this particular expansion results only in sliding along the surfaces 13 and 14. However, the object 10 and members 12 also expand radially relative to the ceramic cylinder 11. This expansion results in a compressive stress on the members 12 causing them to deform primarily by bending, resulting in movement of the object 10 relative to the cylinder 11 in the direction of the apex of the cones, i.e., to the right in FIG. 1.

If the bonds at surfaces 13 and 14 form below the temperature at which copper anneals, then on cooling the apparatus to ambient temperature, the compressive stress is relieved as the copper members 12 and object 11 contract relative to the cylinder 11, and the object returns essentially to its original position relative to the cylinder. Some stress remains on the bonds at the surfaces 13 and 14 because sliding is prevented by the new bonds. During operation as the object 10 is heated the relative expansion of the object and members 12 again cause a compressive stress on the members 12 resulting in relative movement of the object 10. The stresses at surfaces 13 and 14 are at first relieved but then with additional temperature rise return because of the deforming of the members 12. The results of cool down during operation are the same as in the cool down following bonding.

More typically, however, the bonds at surfaces 13 and 14 are formed by brazing at temperatures above the annealing point of copper. As the copper is heated above this temperature, the stresses in the members are relieved. Therefore, as the members 12 cool back through this temperature, they are in a stress-free condition in their distended shape, namely, an elongated and deformed shape relative to the original. The object 10 is also in a stress-free condition in its distended shape, a larger size than the original. As the apparatus cools back to ambient temperature, the relative movement of the object 10 (to the left in FIG. 1) again occurs as the members 12 and object 10 contract relative to the cylinder 11. This relative contraction results in tension in the members 12 which causes them to deform back toward their original shape. However, not all this tension is relieved by this deformation, so that at ambient temperatures the members 12 and the bonds at surfaces 13 and 14 are under stress. On heating during operation, the expansion of the object 10 and members 12 relative to the cylinder 11 begins to relieve this stress while subsequent cool down again creates it.

The thermal expansion coefficients of the various components can be in different relationship than those just described. For example, if the object 10 is of tungsten, it will have a lower coefficient than a ceramic cylinder 11. These different relationships can have the result of creating different stresses than those just described but the members 12 will deform as required to relieve most of these stresses created during assembly and subsequent temperature cycling.

Figure 3:
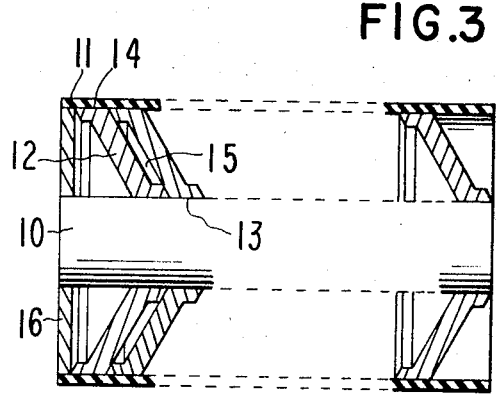
FIG. 3 is a cross-sectional view of apparatus incorporating the same embodiment as in FIG. 1 but with axial movement constrained.

FIG. 3 shows an embodiment of the present invention in which the movement of the heated object 10 described in connection with FIG. 1 is constrained. Again, the object to be heated is shown as a cylinder with circular cross section supported on the axis of a hollow cylinder 11. The heat dissipating members 12 are again shaped generally like hollow truncated cones. In this embodiment a structure 16, such as a hermetic sealing ring, is attached to the object 10 and the cylinder 11, with the result that movement away from this structure 16 is constrained. This situation might occur in a short arc sealed beam lamp in which the object to be heated is a tungsten and copper anode assembly and the structure 16 is part of the envelope containing the gas under high pressure.

In this embodiment, the members 12 deform and tend to fill the spaces 15 between the members in order to relieve any compressive stress. If the annealing temperature is not reached during assembly, then on cooling the members 12 tend to return to their original shape. However, if the annealing temperature is exceeded, on cool down through this temperature the members 12 are in a stress-free condition in the deformed shape. While they will still tend to return to their original shape on further cooling to ambient temperature, the members 12 and the bonds at surfaces 13 and 14 will be under stress. The exact type and magnitude of the stresses depend on the configuration and the relative thermal expansion coefficients of the materials. However, the members 12 will deform as required to relieve most of the stresses created during assembly and subsequent temperature cycling.

Figure 4:
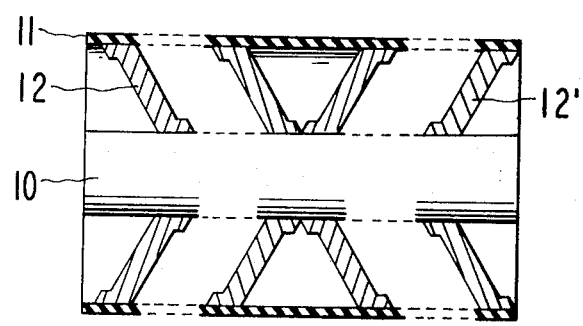
FIG. 4 is a cross-sectional view of apparatus incorporating another embodiment of the heat dissipation device of the present invention.

FIG. 4 shows another embodiment of the present invention. Here the members 12' face in the opposite direction from members 12. As a result the object 10 cannot move relative to the cylinder 11 during the heating and cooling of assembly and subsequent temperature cycling. Like the embodiment shown in FIG. 3, the stresses are relieved by the deformation of members 12 into the spaces 15.

Figure 5:
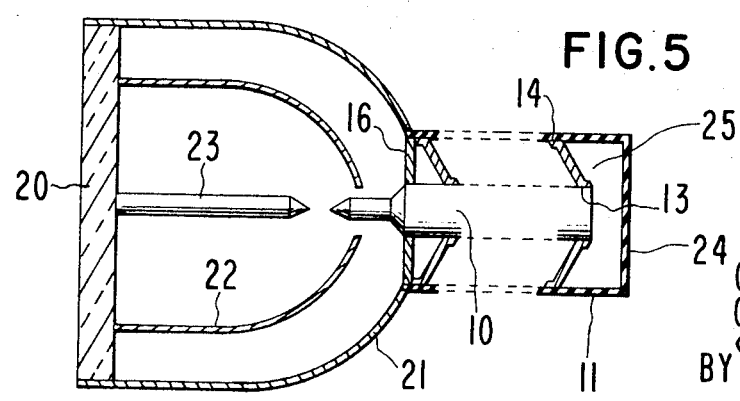
FIG. 5 is a cross-sectional view, partially in schematic, of a short arc lamp incorporating the embodiment of FIG. 1.

FIG. 5 illustrates a short arc lamp incorporating the embodiment of FIG. 3. Details of construction of the lamp are not shown, aside from that of the heat dissipating device. Such lamps are described in detail in, for example, U.S. Pat. No. 3,502,929, issued Mar. 24, 1970.

The lamp has a ceramic member 21 which, together with the window 20 and seal 16, forms a sealed envelope filled with gas under high pressure. A cup 25 formed by a ceramic cylinder 11 and base 24 is attached to the member 21. A reflector 22 is supported within the envelope by appropriate means. One electrode 23 is supported by appropriate means adjacent to the window 20. The other electrode 10 is supported within the cup 25.

The heat dissipating members 12 are again shown as generally cone shaped and are attached to the electrode 10 at surfaces 13 and to the cylinder 11 at surfaces 14. During assembly and temperature cycling, the heat dissipating device performs as described in connection with FIG. 3. The seal 16 may not be required to complete the envelope if the bonds at surfaces 13 and 14 can hold up under the pressures employed. However, in an arc lamp excessive change in the gap between the electrodes cannot be tolerated so that some structure will be required to constrain movement of the electrode 10.

Figure 6:
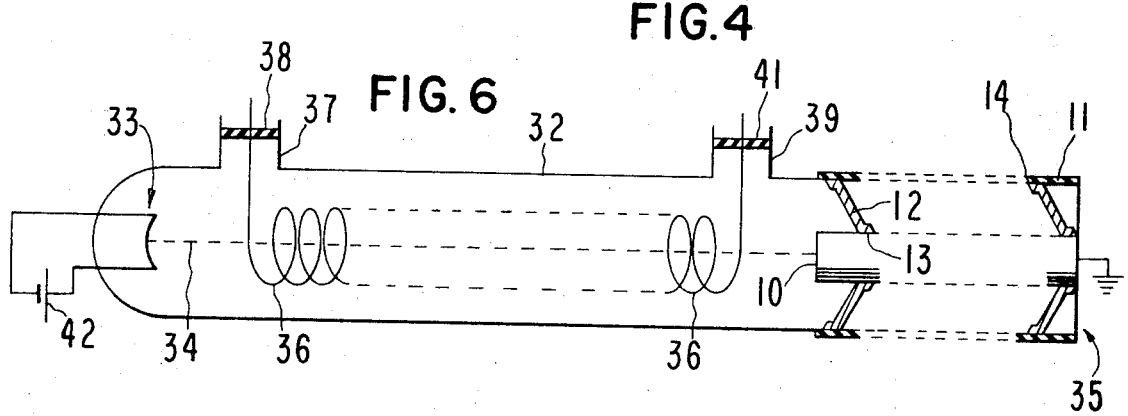
FIG. 6 is a cross-sectional view, partially in schematic, of a travelling wave tube incorporating the embodiment of FIG. 1.

Referring now to FIG. 6, there is shown a microwave travelling wave tube amplifier incorporating the present invention. The amplifier tube includes an elongated vacuum envelope structure 32 having an electron gun assembly 33 mounted at one end for forming and projecting a beam of electrons 34 over an elongaged beam path to a collector structure 35 disposed at the opposite end of the envelope 32. A periodic slow wave circuit 36 is contained within the envelope 32 intermediate the electron gun 33 and the collector structure 35 for cumulative electromagnetic interaction with the electron stream 34 to produce an amplified output signal. The signal to be amplified is applied to the upstream end of the slow wave circuit 36 via an input transmission line 37 having a wave permeable vacuum tight window 38 sealed thereacross. The amplified output microwave signal is extracted from the downstream end of the slow wave circuit 36 via an output transmission line 39 having a wave permeable vacuum tight window structure 41 sealed thereacross. The output signal is fed to a suitable utilization device or load, not shown. A power supply 42 supplies suitable operating potentials to the electron gun assembly 33 relative to the potential of the envelope 32, slow wave circuit 36, and collector structure 35. The potential of the collector 35 relative to the gun 33 typically differs from the potential of the envelope 32 relative to the gun 33. Such a travelling wave tube is described in more detail in U.S. Pat. No. 3,538,377 issued Nov. 3, 1970.

The portion of the beam power which is not converted into useful r.f. output power is converted into heat in the beam collector structure 35 at the beam striker 10. This heat must be dissipated radially out through the ceramic cylinder 11 to an external heat sink, not shown. The heat dissipating members 12 are again shown as generally cone shaped and are attached to the beam striker 10 at surfaces 13 and to the cylinder 11 ar surfaces 14. During assembly and temperature cycling, the heat dissipating device performs as described in connection with FIG. 1.

The thinness of the cone-shaped members allows the deformation described. For example, in one beam striker assembly in a travelling wave tube the inner diameter of the surrounding cylinder was 0.4 inch with the diameter of the beam striker at 0.13 inch. The cone-shaped members were 0.040 inch thick and spaced apart 0.010 inch. The cones were formed with an angle of about 38° from the normal. Just as important, however, the design of the members allows the volume between the heated object and the constraining cylinder to be substantially filled with conductive material. This provides a heat dissipation device of high efficiency but with little resulting stress between the heat dissipation device and the surrounding cylinder. When deformation is necessary, a balance between efficiency of heat transfer and reduction of stress can be achieved by the spacing of the cone-shaped members. The cone shapes can be designed to place the object to be heated in any position desired relative to the axis of the surrounding cylinder. This makes assembly as easy as it would be if a solid heat dissipation device were employed and far easier than the often difficult positioning required by the prior art vanes.

In the prior art vanes, any stress created at the bond between the heat dissipating member and the surrounding cylinder tended to extend longitudinally along the cylinder. This causes a rosette type of stress pattern in the cylinder with alternating areas of stress and no stress around the circumference of the cylinder. Such a stress pattern will weaken the cylinder and can cause it to fracture longitudinally. The stress patterns of the present invention are uniform around the circumference of the cylinder, although they vary longitudinally. A stress pattern of this type is less harmful to the structural stability of a cylinder.

While the invention has been described in terms of a generally cone-shaped member, the cone shape is a matter of convenience only. The cross section of the member could be curved or have any other desired shape and it could have holes cut through it. Essentially the dissipation device is comprised of thin members which have been formed in a shape which is distorted from the lines normal to the surface of attachment of the member to the object. They can be formed by bending, casting or other convenient method.

The invention has been described with reference to a cylindrical object with circular cross section. While assembly is more difficult if the shape of the heated body is irregular, the members can be designed to fit around any shape. This may require that the members be constructed in two or more pieces to be fitted around the object to be heated before being formed into a single member. Similarly, the members can easily be adapted to an irregular constraining structure instead of the regularly shaped cylinder 11.

The invention has also been described with the direction of heat transfer being radially away from a heated object. The invention can equally as well serve to transfer heat in the opposite direction, e.g. from a heated, hollow cylinder radially inward to an element on its axis which conducts heat out of the system.

What is claimed is:

1. Means for dissipating heat from a component of an electrical apparatus through a structure spaced from and surrounding said component, said means comprising a plurality of adjacently disposed thermally conductive annular members surrounding and in bonded thermally conductive attachment to said component, each member having a deformable portion disposed generally angularly at other than a right angle with respect to the surface of attachment of said member to said component, said deformable portion of each member being spaced from the deformable portion of each adjacent member, and each member being in bonded thermally conductive attachment to said structure, said structure being made of electrically insulating material.

2. The heat dissipating means as claimed in claim 1 wherein said component is attached to means preventing movement of said component relative to said structure.

3. The heat dissipating means as claimed in claim 1 wherein said structure is a ceramic cylinder and said component is on the axis of said cylinder.

4. The heat dissipating means as claimed in claim 1 wherein each of said members is shaped generally like a hollow truncated cone.

5. The heat dissipating means as claimed in claim 4 wherein said truncated cone has inner and outer peripheral rims extending parallel to the axis of said cone.

6. The heat dissipating means as claimed in claim 5 wherein said inner and outer peripheral rims extend in opposite directions.

7. The heat dissipating means as claimed in claim 1 wherein said thermally conductive annular members are bonded by a braze to said component of an electrical apparatus and are also bonded by a braze to said electrically insulating structure.

8. The heat dissipating means as claimed in claim 1 wherein at least one of said thermally conductive annular members is hermetically bonded to said component of an electrical apparatus and to said electrically insulating structure.

9. The heat dissipating means as claimed in claim 1 wherein said component of said electrical apparatus is an electrode.

10. The heat dissipating means as claimed in claim 9 wherein said electrical apparatus is an arc lamp.

11. The heat dissipating means as claimed in claim 10 wherein said arc lamp comprises (a) a sealed envelope comprising a base, an optical window opposite said base, and means to support said window apart from said base, (b) two electrodes supported within said envelope and spaced apart to define an arc gap therebetween, (c) an ionizable gas filling said arc gap, and (d) a reflector supported within said envelope; wherein said base comprises a hollow ceramic cylinder that surrounds and is in thermally conductive attachment to said annular members and is the structure through which heat from one of said electrodes is dissipated, said one electrode having a portion coaxially disposed in said ceramic cylinder; and wherein said annular members surround and are in thermally conductive attachment to said one electrode.

12. The heat dissipating means as claimed in claim 9 wherein said electrical apparatus is a travelling wave tube amplifier and said electrode is an electron beam striker.

13. The heat dissipating means as claimed in claim 12 wherein said travelling wave tube amplifier comprises (a) means for forming and projecting a beam of electrons over an elongated beam path, and (b) means forming a periodic slow wave circuit arranged along said electron beam for electromagnetic interaction between a forward travelling wave on said circuit and said beam of electrons to produce an amplified output signal on said circuit; and wherein said means for projecting said beam of electrons includes a beam collector structure comprising (1) a beam striker, (2) a ceramic cylinder that surrounds and is in thermally conductive attachment to said annular members and is the structure through which heat from said beam striker is dissipated, said beam striker having a portion coaxially disposed in said ceramic cylinder, and (3) said annular members that surround and are in thermally conductive attachment to said beam striker.

* * * * *